(12) United States Patent
Murata (10) Patent No.: US 6,809,880 B2
(45) Date of Patent: Oct. 26, 2004

(54) ZOOM LENS SYSTEM (75) Inventor: Masayuki Murata, Saitama (JP)

(73) Assignee: PENTAX Corporation, Tokyo (JP)

( * ) Notice: Subject to any disclaimer, the term of this patent is extended or adjusted under 35 U.S.C. 154(b) by 101 days.

(21) Appl. No.: 10/281,357

(22) Filed: Oct. 28, 2002

(65) Prior Publication Data

US 2003/0086181 A1 May 8, 2003

(30) Foreign Application Priority Data

Oct. 29, 2001 (JP) ........................................ 2001-331086

(51) Int. Cl.$^7$ ............................................. G02B 15/14
(52) U.S. Cl. ........................................ 359/686; 359/682
(58) Field of Search ................................. 359/682, 685, 359/686

(56) References Cited

U.S. PATENT DOCUMENTS

| | | | |
|---|---|---|---|
| 5,264,965 A | 11/1993 | Hirakawa | 359/686 |
| 5,576,890 A | 11/1996 | Tanaka et al. | 359/686 |
| 5,748,384 A | 5/1998 | Sensui | 359/686 |
| 5,786,942 A | 7/1998 | Komori et al. | 359/686 |
| 5,991,093 A * | 11/1999 | Murata et al. | 359/691 |
| 6,317,271 B1 | 11/2001 | Sensui | 359/686 |

FOREIGN PATENT DOCUMENTS

| | | |
|---|---|---|
| JP | 5-313065 | 11/1993 |
| JP | 2000-338397 | 12/2000 |

* cited by examiner

*Primary Examiner*—David N. Spector
(74) *Attorney, Agent, or Firm*—Greenblum & Bernstein, P.L.C.

(57) ABSTRACT

A zoom lens system includes a negative first lens group, a positive second lens group, a negative third lens group, and a positive fourth lens group, and satisfies the following conditions:

$$0.25 < |f_3/ft| < 0.5 \quad (1)$$

$$0.07 < \log(Z_{34})/\log(Z) < 0.17 \quad (2)$$

$$-0.17 < r_{L-1}/ft < -0.14 \quad (3)$$

wherein $f_3$ and $ft$ designates the focal lengths of the third lens group and the entire zoom lens system at the long focal length extremity, respectively, $Z_{34}=m_{34T}/m_{34W}$, wherein $m_{34T}$ and $m_{34W}$ designate the combined magnifications of the third and fourth lens groups at the long and short focal length extremities, respectively; Z designates the zoom ratio of the entire said zoom lens system; and $r_{L-1}$ designates the radius of curvature of the surface on the object side of the negative lens element of the fourth lens group.

2 Claims, 7 Drawing Sheets

-0.5　0.5
SPHERICAL
ABERRATION

THE SINE
CONDITION

Fig. 2B
$F_{NO}=3.7$

—— d Line
······ g Line
--- C Line

-0.5　0.5
SPHERICAL
ABERRATION

CHROMATIC
ABERRATION

-0.5　0.5
ASTIGMATISM

Fig. 2D
W=38.3

-5.0 (%) 5.0
DISTORTION

Fig. 3A
$F_{NO}$=4.6

−0.5  0.5
SPHERICAL
ABERRATION

THE SINE
CONDITION

−0.5  0.5
SPHERICAL
ABERRATION

CHROMATIC
ABERRATION

—— d Line
······· g Line
---- C Line

Fig. 3C
W=22.2

−0.5  0.5
ASTIGMATISM

−5.0 (%) 5.0
DISTORTION

Fig. 4A
$F_{NO}$=6.0

−0.5  0.5
SPHERICAL
ABERRATION

THE SINE
CONDITION

−0.5  0.5
SPHERICAL
ABERRATION

CHROMATIC
ABERRATION

—— d Line
······· g Line
---- C Line

Fig. 4C
W=13.7

−0.5  0.5
ASTIGMATISM

−5.0 (%) 5.0
DISTORTION

-0.5   0.5
SPHERICAL
ABERRATION

THE SINE
CONDITION

Fig. 6B
F_NO=3.5

—— d Line
······ g Line
--- C Line

-0.5   0.5
SPHERICAL
ABERRATION

CHROMATIC
ABERRATION

-0.5   0.5
ASTIGMATISM

Fig. 6D
W=38.3

-5.0 (%) 5.0
DISTORTION

-0.5  0.5
SPHERICAL
ABERRATION

THE SINE
CONDITION

Fig. 7B
$F_{NO}$=4.5

— d Line
···· g Line
--- C Line

-0.5  0.5
SPHERICAL
ABERRATION

CHROMATIC
ABERRATION

-0.5  0.5
ASTIGMATISM

Fig. 7D
W=22.0

-5.0 (%) 5.0
DISTORTION

-0.5  0.5
SPHERICAL
ABERRATION

THE SINE
CONDITION

Fig. 8B
$F_{NO}$=6.0

— d Line
···· g Line
--- C Line

-0.5  0.5
SPHERICAL
ABERRATION

CHROMATIC
ABERRATION

-0.5  0.5
ASTIGMATISM

Fig. 8D
W=13.7

-5.0 (%) 5.0
DISTORTION

-0.5  0.5
SPHERICAL
ABERRATION

THE SINE
CONDITION

Fig. 10B
$F_{NO}=3.8$

—— d Line
······· g Line
--- C Line

-0.5  0.5
SPHERICAL
ABERRATION

CHROMATIC
ABERRATION

-0.5  0.5
ASTIGMATISM

Fig. 10D
W=38.3

-5.0 (%) 5.0
DISTORTION

-0.5  0.5
SPHERICAL
ABERRATION

THE SINE
CONDITION

Fig. 11B
$F_{NO}=4.7$

—— d Line
······ g Line
--- C Line

-0.5  0.5
SPHERICAL
ABERRATION

CHROMATIC
ABERRATION

-0.5  0.5
ASTIGMATISM

Fig. 11D
W=22.2

-5.0 (%) 5.0
DISTORTION

-0.5  0.5
SPHERICAL
ABERRATION

THE SINE
CONDITION

Fig. 12B
$F_{NO}=6.0$

—— d Line
······ g Line
--- C Line

-0.5  0.5
SPHERICAL
ABERRATION

CHROMATIC
ABERRATION

-0.5  0.5
ASTIGMATISM

Fig. 12D
W=13.7

-5.0 (%) 5.0
DISTORTION

Fig. 13

ZOOM LENS SYSTEM

BACKGROUND OF THE INVENTION

1. Field of the Invention

The present invention relates to a zoom lens system suitable for a single lens reflex (SLR) camera, and in particular, relates to a small zoom lens system which has magnification ratio (zoom ratio) of approximately 3.0, and includes a four-lens-group arrangement, i.e., a negative lens group, a positive lens group, a negative lens group, and a positive lens group, in this order from the object.

2. Description of the Prior Art

In the prior art, in a negative-lead type zoom lens system is frequently used in a zoom lens system which can easily make the focal length at the short focal length extremity shorter, and can achieve the photographing angle-of-view of 70° or more. In recent years, a standard zoom lens system used in a SLR camera and the like have been required to have the shorter focal length at the short focal length extremity, and to be smaller in size, and to be inexpensive in cost.

SUMMARY OF THE INVENTION

The present invention achieves a zoom lens system of a four-lens-group arrangement, i.e., a negative lens group, a positive lens group, a negative lens group, and a positive lens group, in this order from the object. The zoom lens system of the present invention can have the shorter focal length at the short focal length extremity, and can be made smaller in size, and inexpensive in cost, by appropriately determining the refractive powers, the lens arrangement, and movement (traveling) conditions, etc., of the each lens group.

As an aspect of the present invention, there is provided a zoom lens system including a negative first lens group, a positive second lens group, a negative third lens group, and a positive fourth lens group, in this order from the object.

Upon zooming from the short focal length extremity to the long focal length extremity, the distance between the negative first lens group and the positive second lens group decreases, the distance between positive second lens group and the negative third lens group increases, and the distance between the negative third lens group and the positive fourth lens group decreases.

The negative first lens group includes a negative meniscus lens element having the convex surface facing toward the object, a negative lens element, and a positive meniscus lens element having the convex surface facing toward the object, in this order from the object.

The negative third lens group includes a positive lens element and a negative lens element which are either cemented to each other or separated from each other, in this order from the object.

The positive fourth lens group includes a positive lens element and a negative lens element which are either cemented to each other or separated from each other, in this order from the object.

The zoom lens system satisfies the following conditions:

$$0.25 < |f_3/ft| < 0.5 \quad (1)$$

$$0.07 < \log(Z_{34})/\log(Z) < 0.17 \quad (2)$$

$$-0.17 < r_{L-1}/ft < -0.14 \quad (3)$$

wherein $f_3$ designates the focal length of the negative third lens group;

ft designates the focal length of the entire zoom lens system at the long focal length extremity;

$m_{34T}$ designates the combined magnification of the negative third lens group and the positive fourth lens group at the long focal length extremity;

$m_{34W}$ designates the combined magnification of the negative third lens group and the positive fourth lens group at the short focal length extremity;

$Z_{34}=m_{34T}/m_{34W}$;

Z designates the zoom ratio ((focal length at the long focal length extremity)/(focal length at the short focal length extremity)) of the entire the zoom lens system; and $r_{L-1}$ designates the radius of curvature of the object-side surface of the negative lens element of the positive fourth lens group.

Furthermore, the positive second lens group can include a positive lens element, and cemented lens elements having a positive lens element and a negative lens element, in this order from the object.

The present disclosure relates to subject matter contained in Japanese Patent Application No. 2001-331086 (filed on Oct. 29, 2001) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
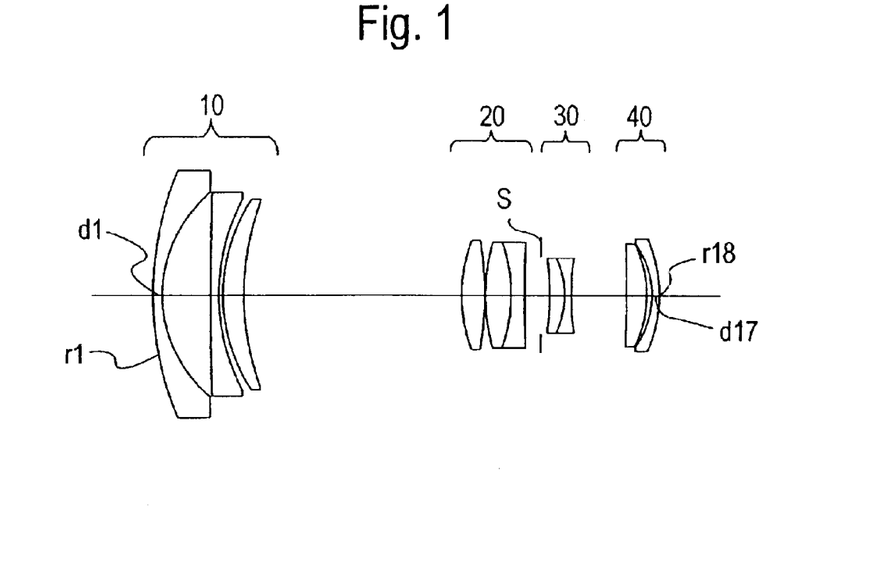
FIG. 1 is a lens arrangement of a zoom lens system according to a first embodiment of the present invention.
Figure 2A:
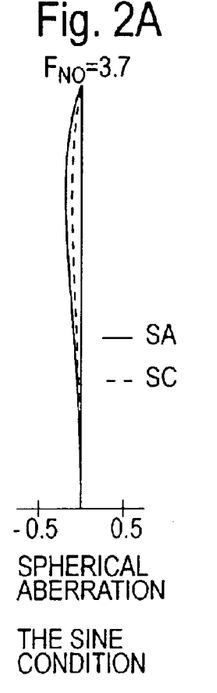
FIGS. 2A, 2B, 2C and 2D show aberrations occurred in the lens arrangement shown in FIG. 1, at the short focal length extremity.
Figures 2B, 2C, 2D:
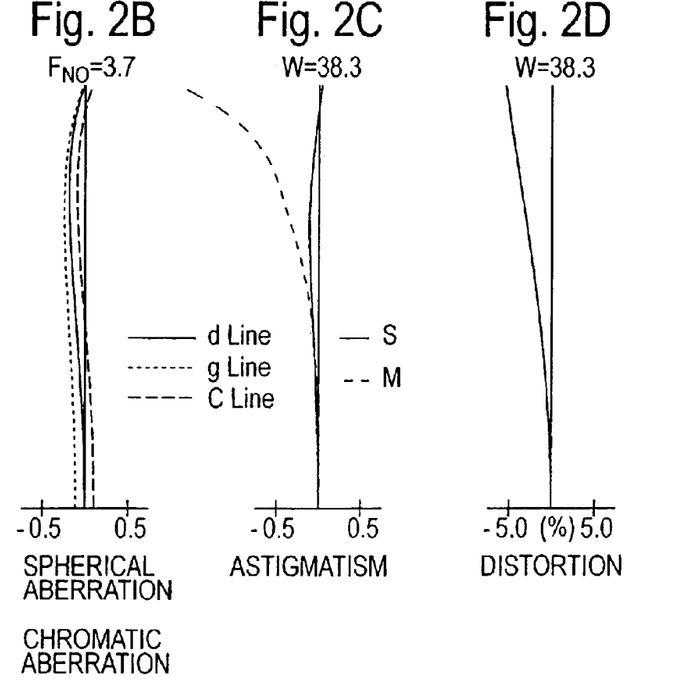
Figure 3A:
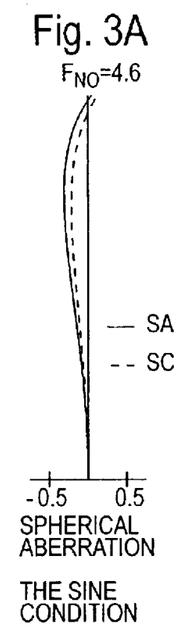
FIGS. 3A, 3B, 3C and 3D show aberrations occurred in the lens arrangement shown in FIG. 1 at an intermediate focal length.
Figures 3B, 3C:
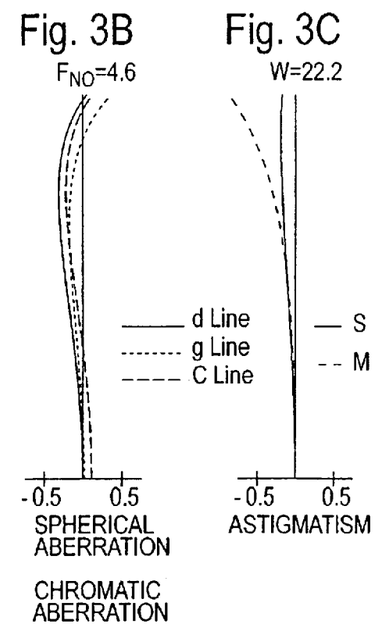
Figure 3D:
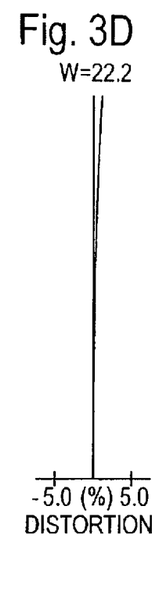
Figure 4A:
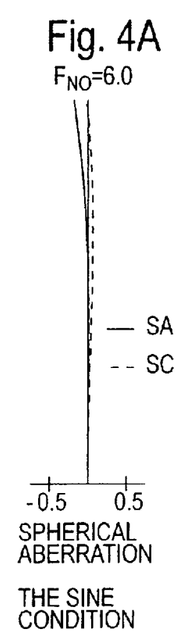
FIGS. 4A, 4B, 4C and 4D show aberrations occurred in the lens arrangement shown in FIG. 1 at the long focal length extremity.
Figures 4B, 4C:
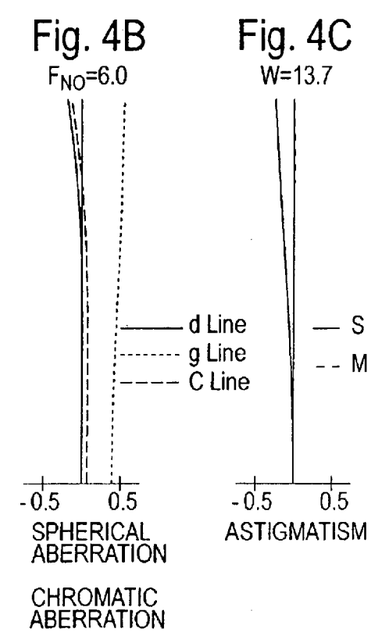
Figure 4D:
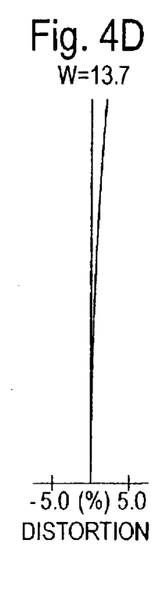
Figure 5:
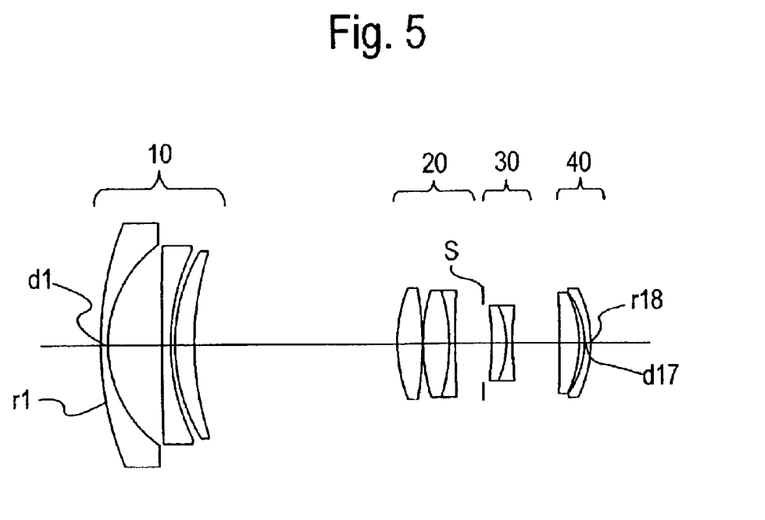
FIG. 5 is a lens arrangement of a zoom lens system according to a second embodiment of the present invention.
Figure 6A:
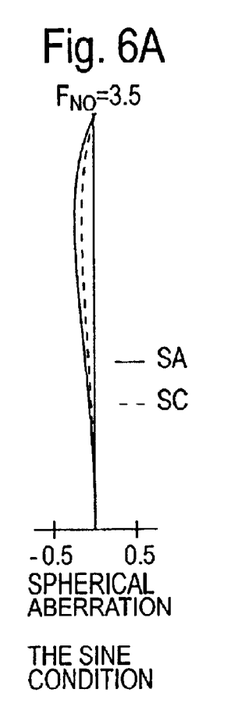
FIGS. 6A, 6B, 6C and 6D show aberrations occurred in the lens arrangement shown in FIG. 5, at the short focal length extremity.
Figures 6B, 6C:
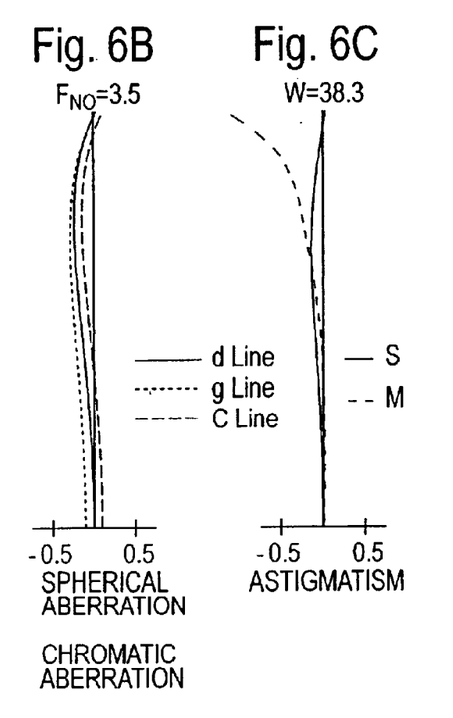
Figure 6D:
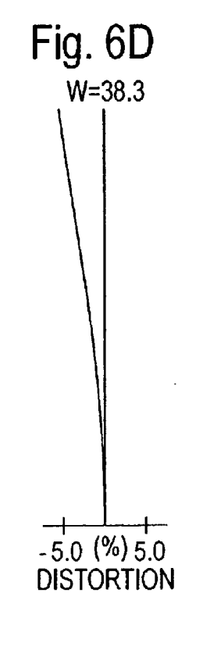
Figure 7A:
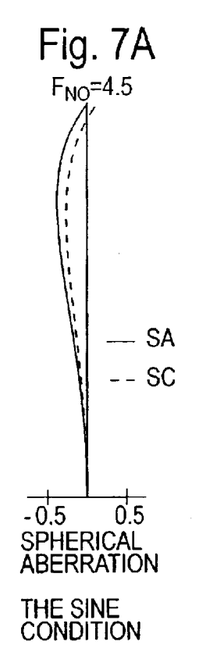
FIGS. 7A, 7B, 7C and 7D show aberrations occurred in the lens arrangement shown in FIG. 5 at an intermediate focal length.
Figures 7B, 7C:
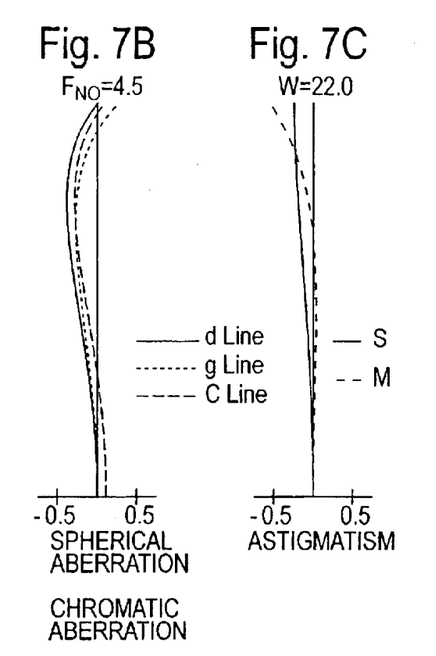
Figure 7D:
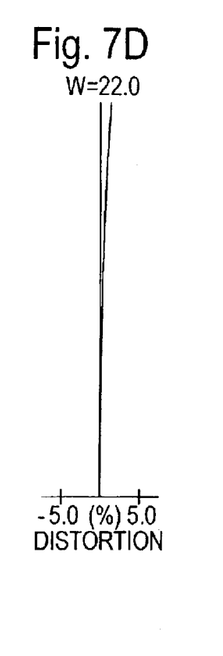
Figure 8A:
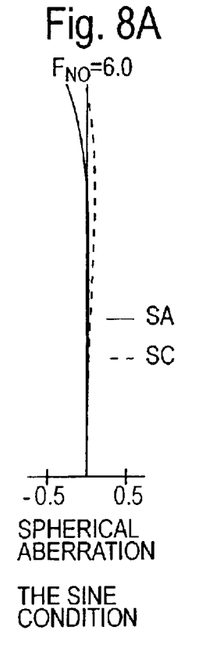
FIGS. 8A, 8B, 8C and 8D show aberrations occurred in the lens arrangement shown in FIG. 5 at the long focal length extremity.
Figures 8B, 8C:
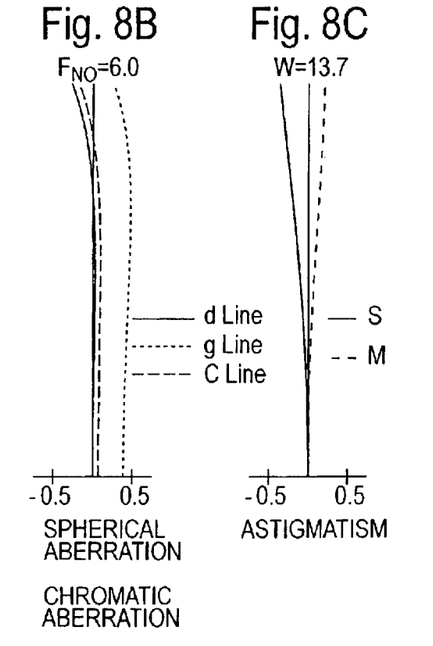
Figure 8D:
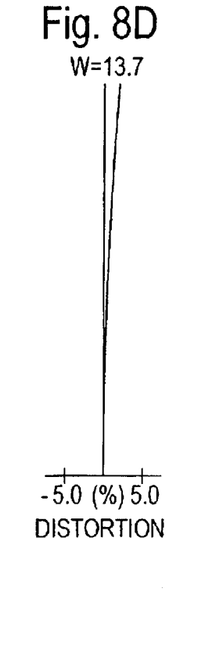
Figure 9:
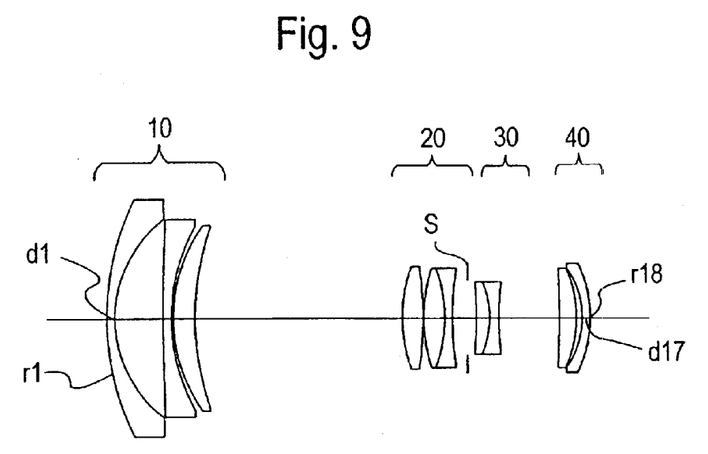
FIG. 9 is a lens arrangement of a zoom lens system according to a third embodiment of the present invention.
Figure 10A:
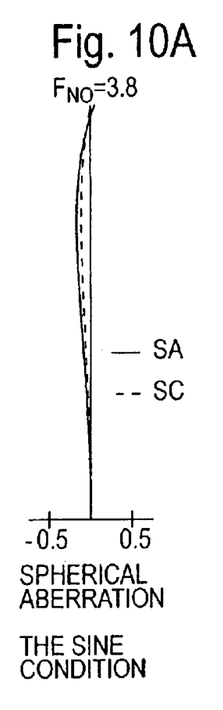
FIGS. 10A, 10B, 10C and 10D show aberrations occurred in the lens arrangement shown in FIG. 9 at the short focal length extremity.
Figures 10B, 10C:
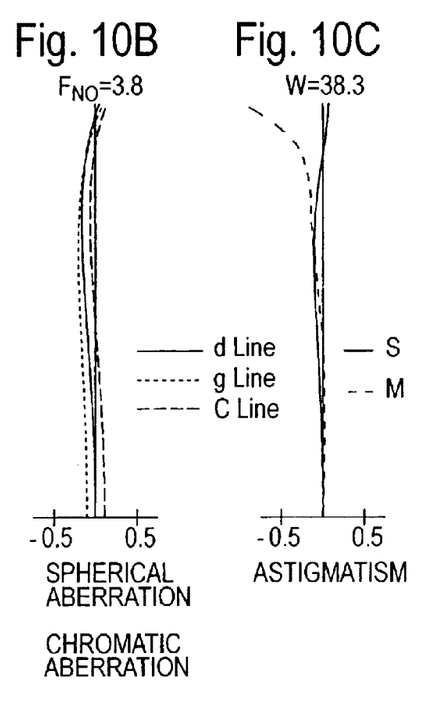
Figure 10D:
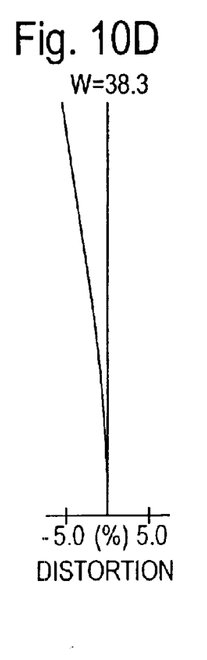
Figure 11A:
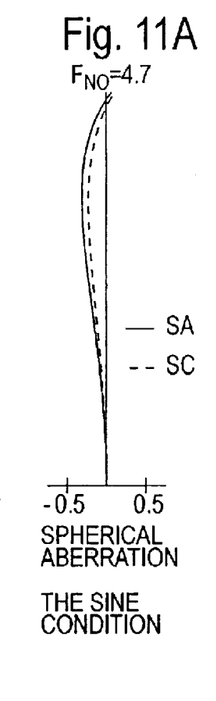
FIGS. 11A, 11B, 11C and 11D show aberrations occurred in the lens arrangement shown in FIG. 9 at an intermediate focal length.
Figures 11B, 11C:
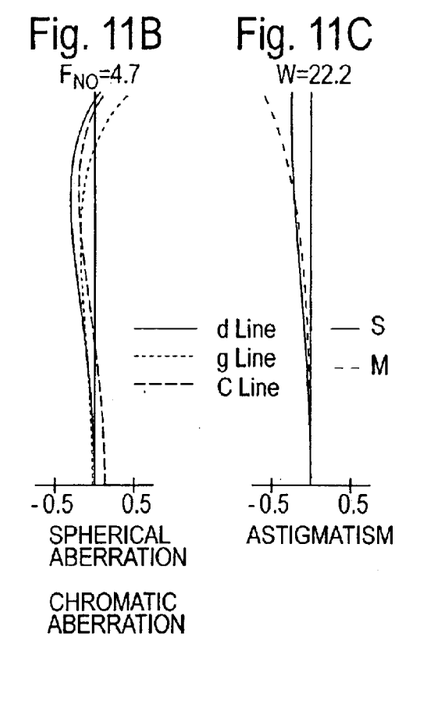
Figure 11D:
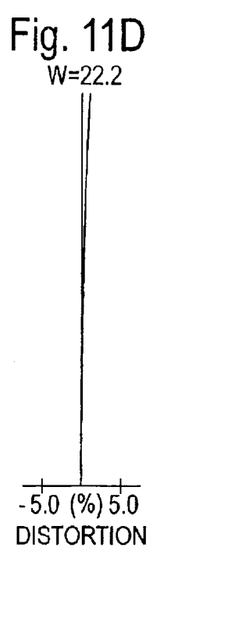
Figure 12A:
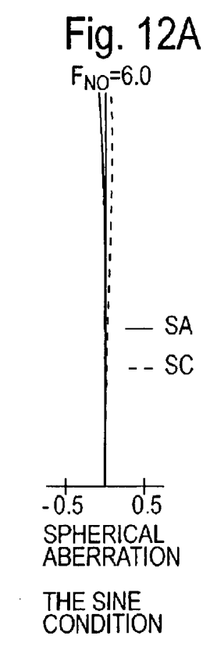
FIGS. 12A, 12B, 12C and 12D show aberrations occurred in the lens arrangement shown in FIG. 9 at the long focal length extremity.
Figures 12B, 12C:
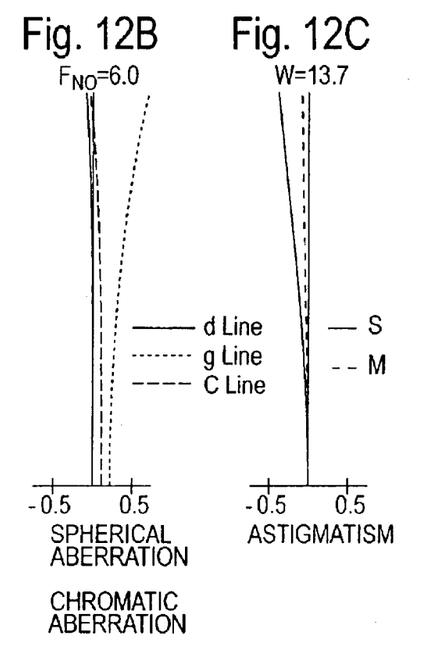
Figure 12D:
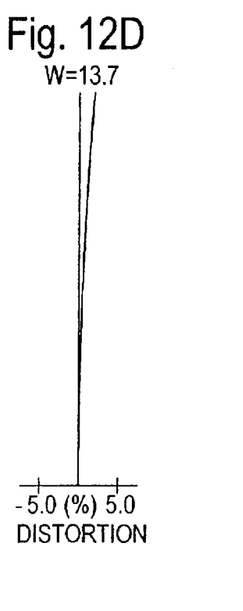
Figure 13:
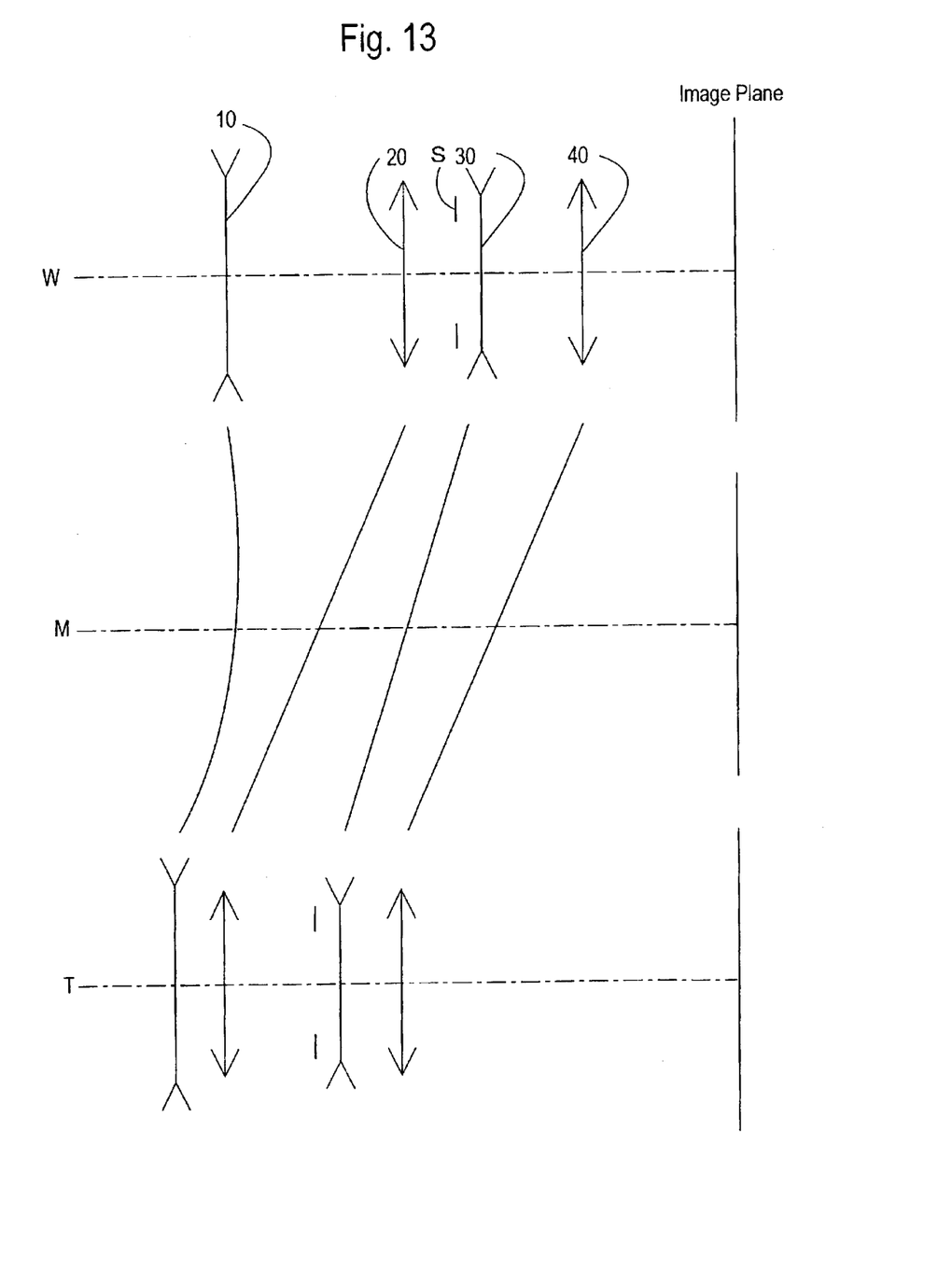
FIG. 13 shows a schematic lens-group moving paths of the zoom lens system according to the present invention.

As shown in the lens arrangement of each embodiment of FIGS. 1, 5 and 9, a zoom lens system according to the present invention includes a negative first lens group 10, a positive second lens group 20, a negative third lens group 30, and a positive fourth lens group 40, in this order from the object. As shown in schematic lens-group moving paths of FIG. 13, upon zooming from the short focal length extremity W (wide-angle extremity) to the long focal length extremity T (telephoto extremity), the negative first lens group 10 first moves toward the image from the short focal length extremity W to an intermediate focal length M, and then and moves back toward the object from the intermediate focal length M to the long focal length extremity T. Furthermore, the positive second lens group 20, the negative third lens group 30 and the positive fourth lens group 40 move toward the object. The distance between the negative first lens group 10 and the positive second lens groups 20 decreases, the distance between the positive second lens group 20 and negative third lens groups 30 increases, and the distance between the negative third lens group 30 and the positive fourth lens groups 40 decreases. A diaphragm S is provided between the positive second lens group 20 and the negative third lens group 30, and moves integrally with the negative third lens group 30 upon zooming.

Condition (1) specifies the focal length of the negative third lens group 30.

If $|f_3/ft|$ exceeds the upper limit of condition (1), it becomes difficult to set an appropriate power to the negative third lens group 30 with respect to the focal length of the entire zoom lens system at the long focal length extremity. Consequently, the overall length of the zoom lens system increases.

If $|f_3/ft|$ exceeds the lower limit of condition (1), coma occurs especially at the long focal length extremity, and the correcting thereof becomes difficult.

Condition (2) specifies the zoom ratio of both the negative third lens group 30 and the positive fourth lens group 40 as a unit (combined body), with respect to the zoom ratio of the entire zoom lens system.

If $\log(Z_{34})/\log(Z)$ exceeds the upper limit of condition (2), fluctuations in field curvature, which occur from the long focal length extremity to the short focal length extremity undesirably increases.

If $\log(Z_{34})/\log(z)$ exceeds the lower limit of condition (2), field curvature undesirably occurs in the positive direction over the entire focal length range.

Condition (3) specifies the object-side surface of the negative lens element in the positive fourth lens group 40.

If $r_{L-1}/ft$ exceeds the upper limit of condition (3), the effect of the correcting of negative distortion at the short focal length extremity increases. However, positive distortion at the long focal length extremity occurs excessively to the extend that the correcting thereof becomes difficult.

If $r_{L-1}/ft$ exceeds the lower limit of condition (3), negative distortion at the short focal length extremity occurs excessively to the extend the correcting thereof becomes difficult.

Specific numerical data of the embodiments will be described hereinafter. In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, $N_d$ designates the refractive index of the d-line, and $v_d$ designates the Abbe number.

[Embodiment 1]

FIG. 1 is a lens arrangement of a zoom lens system according to the first embodiment of the present invention. FIGS. 2A through 2D show aberrations occurred in the lens arrangement shown in FIG. 1, at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. Table 1 shows the numerical values of the first embodiment.

The negative first lens group 10 includes a negative meniscus lens element having the convex surface facing toward the object, a negative lens element, and a positive meniscus lens element having the convex surface facing toward the object, in this order from the object.

The positive second lens group 20 includes a positive lens element, and cemented lens elements having a positive lens element and a negative lens element, in this order from the object.

The negative third lens group 30 includes cemented lens elements having a positive lens element and a negative lens element.

The positive fourth lens group includes a positive lens element and a negative lens element, in this order from the object.

In order to reduce costs, an aspherical lens surface is not employed in the lens arrangement. A diaphragm S is provided 1.495 mm on the object side from surface No. 12.

TABLE 1

$F_{NO}$ = 1:3.7–4.6–6.0
W = 38.3–22.2–13.7
f = 29.00–52.42–87.00
$f_B$ = 36.69–51.74–71.51

| Surface No. | r | d | $N_d$ | $v_d$ |
|---|---|---|---|---|
| 1 | 54.545 | 1.50 | 1.69680 | 55.5 |
| 2 | 22.369 | 7.93 | — | — |
| 3 | 777.868 | 1.30 | 1.58913 | 61.2 |
| 4 | 34.106 | 0.70 | — | — |
| 5 | 28.951 | 3.45 | 1.84666 | 23.8 |
| 6 | 44.321 | 35.76–7.01–2.50 | — | — |
| 7 | 25.401 | 3.78 | 1.58913 | 61.2 |
| 8 | −57.053 | 0.10 | — | — |
| 9 | 32.554 | 4.26 | 1.55690 | 48.6 |
| 10 | −26.669 | 2.20 | 1.80518 | 25.4 |
| 11 | 164.411 | 4.15–7.31–11.46 | — | — |
| 12 | −48.220 | 2.50 | 1.80518 | 25.4 |
| 13 | −15.000 | 1.10 | 1.72000 | 43.7 |
| 14 | 43.891 | 9.15–5.99–1.84 | — | — |
| 15 | −264.346 | 3.35 | 1.77250 | 49.6 |
| 16 | −19.417 | 0.90 | — | — |
| 17 | 14.553 | 1.20 | 1.80518 | 25.4 |
| 18 | −23.594 | — | — | — |

[Embodiment 2]

FIG. 5 is a lens arrangement of a zoom lens system according to the second embodiment of the present invention.

FIGS. 6A through 6D show aberrations occurred in the lens arrangement shown in FIG. 5, at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical values of the second embodiment. The basic lens arrangement of the second embodiment is the same as that of the first embodiment. A diaphragm S is provided 1.500 mm on the object side from surface No. 12.

TABLE 2

$F_{NO} = 1:3.5-4.5-6.0$
$W = 38.3-22.0-13.7$
$f = 29.00-52.83-87.11$
$f_B = 36.69-52.92-73.46$

| Surface No. | r | d | $N_d$ | $v_d$ |
|---|---|---|---|---|
| 1 | 55.839 | 1.20 | 1.60311 | 60.7 |
| 2 | 21.083 | 9.05 | — | — |
| 3 | 737.998 | 1.50 | 1.67790 | 55.3 |
| 4 | 36.200 | 0.74 | — | — |
| 5 | 30.938 | 3.26 | 1.84666 | 23.8 |
| 6 | 50.000 | 34.07–11.38–1.35 | — | — |
| 7 | 25.702 | 4.17 | 1.58913 | 61.2 |
| 8 | −55.555 | 0.10 | — | — |
| 9 | 30.938 | 4.34 | 1.51742 | 52.4 |
| 10 | −30.938 | 1.00 | 1.80518 | 25.4 |
| 11 | 192.730 | 6.23–9.15–12.85 | — | — |
| 12 | −50.204 | 2.50 | 1.80518 | 25.4 |
| 13 | −15.000 | 1.00 | 1.80610 | 40.9 |
| 14 | 52.464 | 7.92–5.00–1.31 | — | — |
| 15 | −196.680 | 3.37 | 1.77250 | 49.6 |
| 16 | −18.847 | 0.93 | — | — |
| 17 | 14.155 | 1.00 | 1.80518 | 25.4 |
| 18 | −20.872 | — | — | — |

[Embodiment 3]

FIG. 9 is a lens arrangement of a zoom lens system according to the third embodiment of the present invention. FIGS. 10A through 10D show aberrations occurred in the lens arrangement shown in FIG. 9 at the short focal length extremity. FIGS. 11A through 11D show aberrations occurred in the lens arrangement shown in FIG. 9 at an intermediate focal length. FIGS. 12A through 12D show aberrations occurred in the lens arrangement shown in FIG. 9 at the long focal length extremity. Table 3 shows the numerical values of the third embodiment. The basic lens arrangement of the third embodiment is the same as that of the first embodiment. A diaphragm S is provided 1.495 mm on the object side from surface No. 12.

TABLE 3

$F_{NO} = 1:3.8-4.7-6.0$
$W = 38.3-22.2-13.7$
$f = 29.00-52.63-87.00$
$f_B = 36.69-51.36-70.43$

| Surface No. | r | d | $N_d$ | $v_d$ |
|---|---|---|---|---|
| 1 | 45.848 | 1.38 | 1.69680 | 55.5 |
| 2 | 21.416 | 8.19 | — | — |
| 3 | 399.560 | 1.38 | 1.69680 | 55.5 |
| 4 | 32.740 | 0.30 | — | — |
| 5 | 27.698 | 3.65 | 1.84666 | 23.8 |
| 6 | 46.854 | 35.01–11.47–0.80 | — | — |
| 7 | 26.168 | 3.52 | 1.61800 | 63.4 |
| 8 | −60.336 | 0.10 | — | — |
| 9 | 28.788 | 3.46 | 1.65412 | 39.7 |
| 10 | −26.120 | 1.30 | 1.80518 | 25.4 |

TABLE 3-continued $F_{NO} = 1:3.8-4.7-6.0$
$W = 38.3-22.2-13.7$
$f = 29.00-52.63-87.00$
$f_B = 36.69-51.36-70.43$

| Surface No. | r | d | $N_d$ | $v_d$ |
|---|---|---|---|---|
| 11 | 50.494 | 4.00–7.67–12.44 | — | — |
| 12 | −65.828 | 2.30 | 1.80518 | 25.4 |
| 13 | −15.000 | 1.50 | 1.76200 | 40.1 |
| 14 | 49.879 | 10.22–6.55–1.78 | — | — |
| 15 | −226.089 | 2.97 | 1.77250 | 49.6 |
| 16 | −20.875 | 1.02 | — | — |
| 17 | −14.696 | 1.30 | 1.80518 | 25.4 |
| 18 | −22.192 | — | — | — |

The numerical values of each condition for each embodiment are shown in Table 4.

TABLE 4

| | Embod. 1 | Embod. 2 | Embod. 3 |
|---|---|---|---|
| Condition (1) | 0.414 | 0.359 | 0.461 |
| Condition (2) | 0.121 | 0.149 | 0.082 |
| Condition (3) | −0.167 | −0.163 | −0.169 |

As can be understood from Table 4, each of the embodiments 1 through 3 satisfy each of the conditions (1) through (3). As can be understood from the aberration diagrams, the various aberrations can be adequately corrected. Furthermore, in all of the embodiments 1 through 3, a miniaturized zoom lens system can be achieved wherein the entire length thereof over the entire zooming range can be maintained at a short length.

According to the above description, a small, low-cost zoom lens system, which includes a wide angle-of-view and has high optical performance, can be achieved.

What is claimed is:

1. A zoom lens system comprising a negative first lens group, a positive second lens group, a negative third lens group, and a positive fourth lens group, in this order from an object, wherein upon zooming from the short focal length extremity to the long focal length extremity, the distance between said negative first lens group and said positive second lens group decreases, the distance between said positive second lens group and said negative third lens group increases, and the distance between said negative third lens group and said positive fourth lens group decreases;

wherein said negative first lens group comprises a negative meniscus lens element having the convex surface facing toward said object, a negative lens element, and a positive meniscus lens element having the convex surface facing toward said object, in this order from said object;

wherein said negative third lens group comprises a positive lens element and a negative lens element that are either cemented to each other or separated from each other, in this order from said object;

wherein said positive fourth lens group comprises a positive lens element and a negative lens element which are either cemented to each other or separated from each other, in thus order from said object; and wherein said zoom lens system satisfies the following conditions:

$0.25<|f_3/ft|<0.5$ $0.07<\log(Z_{34})/\log(Z)<0.17$ $-0.17<r_{L-1}/ft<-0.14$ wherein $f_3$ designates the focal length of said negative third lens group; ft designates the focal length of the entire zoom lens system at the long focal length extremity;

$m_{34T}$ designates the combined magnification of said negative third lens group and said positive fourth lens group at the long focal length extremity;

$m_{34W}$ designates the combined magnification of said negative third lens group and said positive fourth lens group at the short focal length extremity;

$Z_{34}=m_{34T}/m_{34W}$;

Z designates the zoom ratio ((focal length at the long focal length extremity)/(focal length at the short focal length extremity)) of the entire the zoom lens system; and $r_{L-1}$ designates the radius of curvature of the object-side surface of said negative lens element of said positive fourth lens group.

2. The zoom lens system according to claim 1, wherein said positive second lens group comprises a positive lens element, and cemented lens elements comprising a positive lens element and a negative lens element, in this order from said object.

* * * * *